April 12, 1949.   L. W. REINKEN   2,467,336

DIRECT CURRENT POWER SUPPLY

Filed Oct. 29, 1945

INVENTOR.
Louis W. Reinken
BY
Watson, Bristol, Johnson & Leavenworth
ATTORNEY

Patented Apr. 12, 1949

2,467,336

UNITED STATES PATENT OFFICE 2,467,336

DIRECT-CURRENT POWER SUPPLY

Louis W. Reinken, Plainfield, N. J., assignor to W. Green Electric Company, Inc., New York, N. Y., a corporation of New York Application October 29, 1945, Serial No. 625,161

3 Claims. (Cl. 321—18)

The present invention relates to D.-C. power supplies and, more particularly, to rectifier circuits adapted to be connected to A.-C. power supply circuits and to deliver D.-C. power.

A general object of the present invention is to provide such D.-C. power supply apparatus, which is simple, economical, and remarkably successful in converting A.-C. power into D.-C. output power of substantially constant voltage within unusually close control limits particularly adapted for supply of resistive and/or inductive loads or complex variations thereof which may include a small capacitive load, with effective compensation both for variations in current drawn from the apparatus, or load imposed thereon, and for variations in the voltage of the A.-C. power supplied to the apparatus.

A more specific object of the invention is the provision of such rectifier apparatus which, while permitting use of high vacuum grid-controlled rectifier tube means, is particularly adapted to employment of gas- or vapor-filled grid-controlled rectifier tube means having relatively large current-carrying capacities and relatively low voltage drops thereacross, with attainment of unusual stabilization of output D.-C. voltage despite load current variations of zero to maximum tube rating even when occurring as rapidly as many times a second and despite variations in voltage of the A.-C. power supply of the order of plus or minus ten percent (10%), the ouput voltage of a typical apparatus designed normally to supply in the neighborhood of one hundred and sixty volts (160 v.) D.-C. at a maximum amperage of four amperes (4 amps.) being efficiently maintainable within variations limits of about four to six volts (4–6 v.) peak for the most trying conditions.

Another object of the invention is to provide such rectifier means which will efficiently assure attainment of unusually stabilized D.-C. output with variable load current of resistive and/or inductive loads and complex variations thereof, of a magnitude not heretofore obtainable with series regulator tube circuits, and in a manner more economical and effective than that characteristic of employment of electro-mechanical devices, or of circuits employing saturated chokes, while permitting efficient employment of grid-controlled gas-filled rectifier tubes and an important minimization of series voltage drop between the rectifier devices and the load under full load conditions.

A further object of the invention is the provision of rectifier apparatus employing grid-controlled rectifier tube means in converting A.-C. power to D.-C. power with the rectifier control grid means so connected in circuit that the grid bias is proportionate to the difference in potential between a reference voltage and at least a portion of the voltage produced by the rectifier means across energy reservoir means, such as reservoir condenser means, connected across D.-C. output terminals, for connection to resistive or inductive loads, or combinations thereof, or complex variations thereof inclusive of some small amount of capacitive load, resulting in efficient maintenance of substantially constant output voltage despite variations in load current and A.-C. voltage of the power supply.

Still another object of the invention is to provide as grid bias of grid-controlled rectifier tube means a voltage proportionate to the difference in potential between the voltage across energy reservoir condenser means and a substantially constant reference voltage of means such as a battery or a separately supplied voltage regulated tube connected between the negative output terminal and rectifier grid means.

A still further object of the invention is the provision, in such rectifier circuits characterized by rectifier grid bias provided by the difference in potential between D.-C. output voltage and a reference voltage, of reservoir condenser means across the load terminals so that fluctuating voltage delivered by the rectifier means to the load may be integrated and used for comparison with the reference voltage.

Other objects of the invention will in part be obvious and will in part appear hereinafter.

The invention accordingly comprises the features of construction, combination of elements and arrangement of parts, which will be exemplified in the construction hereinafter set forth and the scope of the invention will be indicated in the claims.

For a fuller understanding of the nature and objects of the invention, reference should be had to the following detailed description taken in connection with the accompanying drawing, in which.

Figure 1:
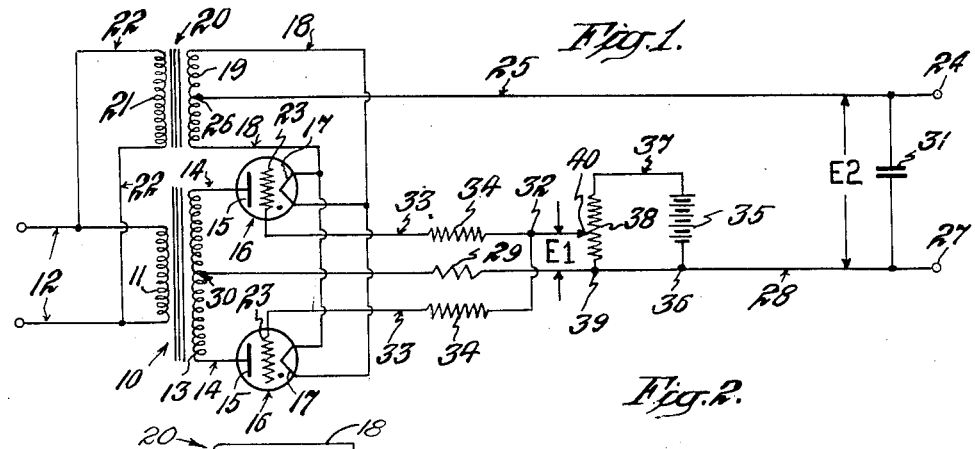
Fig. 1 is a diagrammatic showing of an electrical rectifier circuit embodying one form of the present invention.

Referring to the drawings, like numerals identify like parts throughout and, as indicated in Fig. 1, the rectifier apparatus of the present invention may comprise a step-up (or step-down, if desired) transformer 10 having its primary winding 11 adapted for connection, such as by means of terminals 12, 12, to a suitable A.-C. power supply such as one hundred fifteen or two hundred thirty volts (115 or 230 v.) sixty (60) cycle A.-C. The step-up transformer 10 may be of the conventional mid-tap type to permit connection thereto of rectifier tube means in a single phase full-wave center-tap circuit. Thus the transformer 10 includes a secondary winding 13 having terminal ends 14, 14 thereof each connected to anode means or the plate 15 of a suitable grid-controlled rectifier tube 16 which may be a gas-filled triode. The triodes 16, 16 each may be of the type employing a hot filament cathode 17 with those filaments connected in parallel by conductors 18, 18 to the ends of a mid-tapped secondary winding 19 of a step-down transformer 20, in turn having its primary winding 21 connected by conductors 22, 22 in parallel with the primary winding 11 of the step-up transformer 10, such as by connection to input terminals 12, 12 of the latter.

The rectifier triode tubes 16, 16 each includes within its envelope between the anode and cathode a control grid 23. These gas-filled triodes may be of the type wherein their envelopes are filled with an inert gas, such as xenon or argon, or they may be filled with mercury vapor; or, if desired, such rectifier tubes may be of the high vacuum type. Further, it will be understood that the triodes 16, 16 may be either of the directly heated cathode type as shown, or of the indirectly heated cathode type, and that, instead of the employment of two separate tubes, a single twin triode may be used wherein all of the tube elements are included within a single envelope, in which case the cathode means may comprise a single heated filament. In any event, each of the two rectifier tube means must comprise at least anode means or a plate, control grid means, and a source of electrons such as an indirectly heated cathode or heated cathode filament or, if desired, even a cold cathode. Further, as indicated hereinafter, the rectifier tube means may include additional electrodes. For example, for each of the triodes 16, 16 a tetrode may be substituted which would make possible adjustment of the working range or operating characteristic by variation of the bias on the fourth electrode, which might also allow for compensation for differences between tube characteristics by adjustment of the bias on the fourth electrode.

As is usual in such rectifier circuits which, however, employ diode rectifier tubes rather than grid-controlled tubes, the cathode means is connected to a D.-C. output terminal, preferably the positive terminal, as shown in Fig. 1. With the employment of cathode means comprising heated filaments, a positive output terminal 24 is connected by a suitable conductor 25 to a center-tap 26 of the secondary winding 19 of the filament supply transformer 20. It is also common practice to connect the other output terminal, preferably the negative terminal, to the A.-C. supply means, such as by connection to the mid-tap of the transformer secondary winding having its ends connected to the plates of the rectifier tube means. As shown in Fig. 1, the negative output terminal 27 is preferably connected by a conductor 28 through a resistor 29 to the mid-tap 30 of the secondary winding 13 of transformer 10.

The employment of the resistor 29 in the negative side of the output circuit is not usual but is here employed desirably to limit the maximum current which may be drawn from the rectifier tubes 16, 16, which may be advantageous in connection with the employment of energy reservoir means or condenser means 31 connected, in accordance with the present invention, across the output terminals 24 and 27, particularly since it will limit maximum current drawn from the rectifier tube means. The resistor 29 may be omitted, particularly if the characteristics of the transformer 10 are suitable, or if resistors are inserted between terminals 14, 14 and anodes 15, 15.

As remarked above, in accordance with the present invention, the rectifier tube means have control grids, such as 23, 23, and these control grids are connected together at 32 by conductors 33, 33 each of which has inserted therein a resistor 34. The resistors 34, 34 in series with the control grids 23, 23 are used to limit the amount of current which can be drawn by the grids themselves.

The positive potential of the grid means of the rectifier tube means, i. e., grids 23, 23, with reference to the negative output terminal (provided, of course, the grids are non-conducting) may, in accordance with the present invention, be provided by a substantially constant D.-C. voltage source which may comprise a battery 35 having its negative terminal connected at 36 to the negative output terminal conductor 28 and its positive terminal connected by a conductor 37 to one end of a potentiometer 38, with the other end of the latter connected to negative output terminal conductor 28 at 39. The sliding tap 40 of the potentiometer 38 is connected to the control grid means of the rectifier tube means, such as at 32 where the two grid circuits 23, 23 are tied together. There will thus be provided a potential difference between the control grids and the reference or negative terminal of the output circuit, and this may be considered to be a reference voltage, indicated in Fig. 1 as $E1$. The instantaneous potential difference between the output terminals 24 and 27 which will be the voltage across the load and, of course, the voltage across the energy reservoir or condenser means 31, is indicated in Fig. 1 as being $E2$.

It will thus be obvious that the instantaneous grid bias of the rectifier tube means, i. e., of either rectifier tube 16, which of course is the difference in potential between the control grid means and the cathode means of that rectifier tube means, is equal to the difference between the two voltages $E2$ and $E1$, i. e., the instantaneous voltage across the output terminals 24 and 27 and the reference voltage. Incidentally, either of the two grids 23, 23 may draw current without affecting the bias of the other grid provided that the resistances of both resistors 34, 34 are large compared to the resistance of the potentiometer 38 and the internal resistance of the battery 35.

The reference voltage $E1$ obviously may be adjusted by selected positioning of the sliding tap 40 thereof. In apparatus employing the circuit of Fig. 1, when the voltage $E2$ is higher or more positive with respect to negative reference output terminal 27, or its conductor 28, than reference voltage $E1$, the grid bias is negative. If $E2$ is smaller than $E1$, then the grid bias is positive, and if $E2$ is equal to $E1$ the grid bias is zero.

A typical gas-filled triode, such as the Continental Electric type CE305, will with zero grid bias fire (conduct current) when the difference of potential between the anode and cathode means thereof is of the order of fifteen to seventy-five volts (15–75 v.). If the grid bias be increased to a negative value of a few volts, the tube can be prevented from firing since the characteristics thereof are such, for example, that a negative grid bias of approximately six volts (6 v.) will prevent the tube from firing when the instantaneous anode voltage is five hundred volts (500 v.).

In operation of the embodiment of the present invention proposed in Fig. 1, with the employment of gas-filled triodes such as Continental Electric type CE503 as rectifier means at 16, 16, with the input terminals 12, 12 connected to an A.-C. power supply such as one hundred fifteen volts (115 v.) sixty (60) cycle A.-C., and the output terminals 24 and 27 connected to a D.-C. load, whenever E2 exceeds the reference voltage E1 by more than a few volts the rectifier tubes 16, 16 will not fire or conduct current, since the bias of the grids of the latter is appreciably negative.

Presupposing charging of the energy reservoir means or condenser 31 initially upon supply of A.-C. power to the rectifier apparatus, the load connected across output terminals 24 and 27 will draw current from that reservoir condenser means until voltage E2 has decreased in value by a few volts to the point where E2 approaches the reference voltage E1 or is equal to it, resulting in substantially zero bias for rectifier grids, or where conceivably E2 may be slightly less than E1 with slight positive bias for rectifier grids. Under these latter conditions the rectifier tubes 16, 16 will freely conduct current or fire and recharge condenser 31. The condenser means 31 thus, in operation, acts as an energy reservoir which is intermittently filled by the rectifier tubes and from which the load draws its current. By such action the fluctuating voltage across the load is integrated and may be used for comparison with the reference voltage. With the reference voltage E1 being maintained substantially constant, variations in the output voltage E2 automatically adjust the biasing of the control grids of the rectifier tube means. This, in turn, automatically compensates, by the resultant intermittent firing of the rectifier tubes, for fluctuations in the load voltage, tending greatly to minimize such fluctuations.

It will be observed that with a sixty (60) cycle A.-C. supply each of the rectifier tubes is in a potentially current-conducting or firing condition for not more than one one-hundred-twentieth of a second (1/120 sec.) with a rest interval of approximately one one-hundred-twentieth of a second (1/120 sec.). This alternation of potential on the plates of the gas-filled rectifier tubes is necessary in order that the grids may regain control. With the use of small thyratron tubes, apparatus schematically shown in Fig. 1 performed in the above desired manner.

Figure 2:
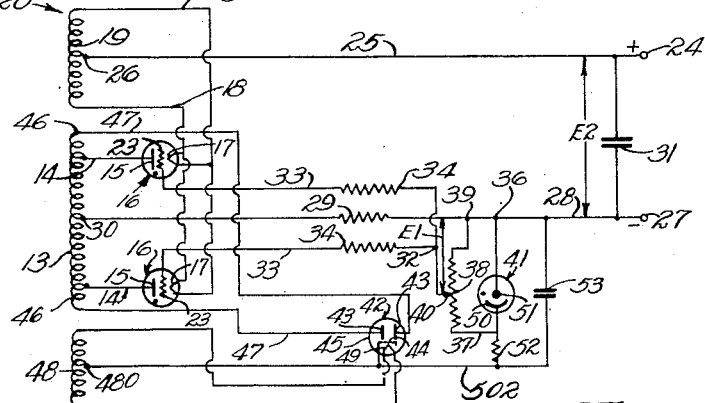
Fig. 2 is a similar circuit diagram showing another embodiment of the present invention.

In a practical commercial embodiment of the circuit shown in Fig. 1 the battery at 35 was replaced, as indicated in Fig. 2, by a voltage regulated glow tube 41 which was energized from a small auxiliary rectifier tube 42 of the full wave high vacuum type with two plate anodes 43, 43 and one heated cathode 44 in a single envelope 45. The A.-C. supply to the plates 43, 43 of this auxiliary rectifier tube 42 means was taken from the supply transformer secondary 13 by extending the latter winding beyond the connections 14, 14 to plates 15, 15 of the main rectifier tubes 16, 16, as shown at 46, 46. The extremities 47, 47 of these additive turns 46, 46 of the secondary 13 were respectively connected to the two plates 43, 43 of the auxiliary rectifier tube means 42. An additional secondary winding 48 on the filament transformer supply 20 was employed as a supply for the filament 49 for indirectly heating the cathode 44 of this auxiliary rectifier tube means 42. The voltage-regulated glow tube 41 was connected across from output terminal conductor 28 (in view of mid-tap 30 being common to both rectifier circuits) to this auxiliary secondary winding 48 on the filament supply transformer. Of course it will be understood that the anode 50 of the voltage regulated glow tube 41 was the element of this tube which was connected to the cathode circuit of the auxiliary rectifier tube means 42. Suitable resistance means, such as potentiometer 38, was bridged across the voltage-regulated glow tube 41 and the sliding tap 40 thereof was connected to common point 32 where the grid circuits of the main rectifier tube means 16, 16 were tied together. As shown in Fig. 2, the glow tube cathode 51 is connected to the negative terminal conductor 28 at 36 and one end of the potentiometer winding 38 is connected to that conductor at 39 with its other end connected to anode 50 by wire 37. Conductor 502 connects glow tube anode 50 to rectifier cathode 44 and the mid-tap 480 of winding 48. A resistance 52, in accordance with standard practice and instructions of the manufacturer of the glow tube 41, is inserted in conductor 502, between glow tube anode 50 and rectifier tube 42, to perform the well known function of limiting the current through the glow tube. Further, in accordance with standard practice, condenser 53 is shunted around glow tube 41 and its series resistance 52 to keep the glow tube lit at all times. The use of resistance 52 and condenser 53 constitutes nothing new and has no bearing on the novelty of the system of Fig. 2, since the latter will operate in their absence.

It will thus be seen that in a circuit of the type shown in Fig. 1 practice of the present invention requires a relatively large reference voltage which is substantially equal to the working output voltage. If a battery such as that at 35 is to be employed it must be sufficiently large to obtain such a condition or, if a voltage-regulated glow tube is used in substitution therefor, then an auxiliary source of voltage which is higher than the load potential E2 should be provided.

In a working model embodying the features of Fig. 2 grid control rectifier tube means were provided as two gas-filled Continental Electric type CE305 triode tubes, and time delay relay means were utilized to allow the filaments of these triode tubes to come up to proper operating temperature before the plate supply through the step-up transformer 10 was automatically closed. In addition, a voltage change switch was associated with a plurality of taps on the plate supply transformer secondary winding 13 so that a choice of either of two voltage ranges could be obtained at will. The energy reservoir or condenser means 31 was provided by a plurality of electrolytic condensers connected in paralled to provide two thousand seven hundred microfarads (2,700 mf.) capacity. The voltage regulator tube 41 was neon type, and obviously where voltage demands are greater than that which may be met by any single voltage regulator tube available on the market two or more as needed may be used in series. A voltmeter and a milliammeter were also included in this rectifier apparatus to indicate the output voltage and current, respectively.

Tests with this working model showed that the load current could be varied over a range of from zero to four amperes (0-4 amps.), either slowly or at a rate of many times a second, and simultaneously that the A.-C. supply voltage could be varied over a range of from one hundred ten to one hundred twenty-five volts (110-125 v.) without appreciable change in the nominal output voltage of one hundred sixty volts (160 v.). However, under conditions of zero load current it was observed that the voltmeter needle fluctuated between potentials of approximately one hundred fifty-six to one hundred sixty volts (156–160 v.), with the needle moving gradually down from the one hundred sixty volt (160 v.) position to the one hundred fifty-six volt (156 v.) position as the condensers discharged through the parallel resistive circuit within the rectifiers. As the voltmeter needle approached the one hundred fifty-six volt (156 v.) position, one of the rectifier tubes would fire at random, which would bring the condenser potential back to approximately one hundred sixty volts (160 v.).

It will thus be seen that under no load conditions the output voltage was quite well stabilized. Under load conditions no fluctuations of the voltmeter needle were observed. Load operating characteristics were checked with an oscilliscope and it was found that, even though there could be single rectifier tube firing under low load conditions in certain specific models, the current drain was well within the rated capacity of the tube. In such instances, as the load current was increased, alternate firing of both tubes was obtained and this condition was maintained up to maximum rated capacity of the rectifier apparatus. Measurements with a peak voltage reading vacuum tube voltmeter which was connected in parallel with the oscilloscope across the output terminals showed that the peak ripple voltage was of the order of four to six volts (4–6 v.), depending upon the load current.

It is to be understood that the rectifier circuit of the present invention may be employed with the use of a variety of types of grid-controlled rectifier tube means. Although the circuits illustrated in Figs. 1 and 2 are of the single phase full-wave type, it is obvious that the invention may be practiced in connection with polyphase circuits, such as those of the three phase half-wave type following the teachings of prior practice in connection with ordinary rectifier circuits as to the arrangement of rectifier tube means. A variety of types of multi-element rectifier tubes may be employed, such as grid-controlled double grid tubes, either of the gas-filled or high vacuum types, grid-controlled screen grid tubes and grid-controlled pentode tubes, by adoption of normal precautionary measures of connecting the additional electrodes into circuit, in accordance with standard practice, to secure desirable grid to plate characteristics.

Figures 3, 4, 5:
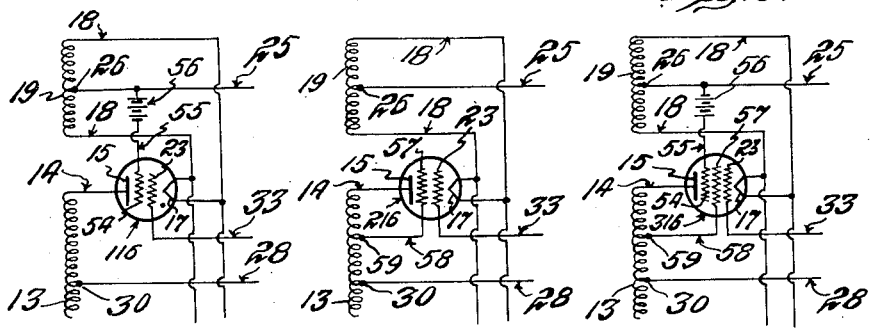
Figs. 3, 4 and 5 are diagrammatic showings of that portion of the circuit shown in either Figs. 1 or 2 relating to the rectifier tube means exemplifying employment of different types thereof.

For example, as shown in Fig. 3, a grid-controlled gas-filled tetrode tube with a shield grid may be substituted at 116 for the triode tube 16 in either of the circuits schematically shown in Figs. 1 and 2. The anode plate 15, the cathode means 17, and control grid 23 are connected in circuit in the same manner as are those elements of the triode tube. The shield grid 54 is connected by a conductor 55 through a suitable source of D.-C. potential, such as a battery 56, to the cathode means of the rectifier tube, such as by connection to the mid-tap 26 of the secondary winding 13 of the filament supply transformer. If the shield grid 54 is sufficiently positive, then the control grid 23 must be operated with zero to negative bias. However, if the shield grid 54 is sufficiently negative, the control grid 23 must have zero to positive bias.

As shown in Fig. 4, tetrode screen grid tubes, such as grid-controlled high vacuum tubes, may be employed as rectifier tube means in the circuits of Figs. 1 and 2. For this purpose a tetrode 216 may be substituted for each of the triodes 16 with the screen grid 57 connected by a conductor 58 to a tap 59 on the transformer secondary winding 13.

In Fig. 5 is shown the hookup of the rectifier portion of the circuit of either Figs. 1 or 2, with the substitution of a pentode rectifier tube 316 for the triode tube 16. Although obviously, and perhaps desirably, gas-filled rectifier tubes may be used, since pentodes are usually of the high vacuum type the hookup of Fig. 5 is shown employing the latter type. It will be noted that the shield screen grid 57 is connected in circuit similarly to the screen grid of the tetrode 216 in Fig. 4, that is, by means of a wire 58, to a tap at 59 on the secondary winding 13 of the A.-C. supply transformer. The suppressor grid 54 is connected in the circuit similarly to the shield grid 54 of the gas-filled tetrode of Fig. 3, that is, by means of a wire 55 through a D.-C. source of potential or battery 56, to the cathode means, or directly to the cathode means with the battery omitted. It will be understood, of course, that in both Figs. 3 and 5 the grids 54 may be connected to the cathode means either at zero, positive or negative potential difference as the desired conditions may dictate in accordance with standard practice.

Of course, with regard to Figs. 3, 4 and 5, the remainder of the circuit of the rectifier apparatus with such substitutions of rectifier tubes will remain substantially the same as shown in or proposed above in connection with Figs. 1 or 2.

Rectifier apparatus embodying the above described circuits of the present invention are valuable from a commercial point of view since they offer means of securing stabilized D.-C. output with load current not hitherto obtainable with series regulator tube circuits and in a manner more economical than that provided with electro-mechanical devices or circuits employing saturated chokes. Furthermore, the inherent efficiency of apparatus of the present invention is high since gas-filled rectifier tubes may be used, and under full load conditions the inherent voltage drop in the rectifier means is small. Mercury vapor or gas-filled grid-controlled rectifier tubes with capacities rated at twelve and one-half amperes (12½ amps.) are available, and consequently in single phase circuits it is easily possible to obtain stabilized D.-C. outputs with rectifier circuits of the present invention rated at twenty-five amperes (25 amps.) or, in three-phase circuits, even higher. As pointed out above, although the circuits illustrated in the drawing are of the single phase full-wave type, the invention may be practiced in connection with polyphase circuits, such as the three-phase half-wave type. The present invention is particularly adapted for supplying from A.-C. power lines D.-C. power for such operation of D.-C. machinery as is critical with regard to D.-C. voltage variations, such as certain types of motors, and for supplying D.-C. power to telegraph, teleprinter and teleregister circuits, for battery charging, etc. The importance of the commercial aspects of the present invention are particularly apparent with respect to the supply of load current for apparatus which are either of the resistive or inductive load types, or combinations thereof, and complex variations including with resistive and/or inductive loads small capacitive loads. For such uses the energy storage condenser is imperative and important. Other systems have been devised for supply of D.-C. current to storage batteries or other large capacitive loads but they are not adapted to efficient operation and voltage control in association with the other types of loads remarked above. Unlike those systems the present system is featured by fixed grid potentials for the rectifier tubes and only their cathode potentials are varied in an automatic manner which makes for extreme and unusual sensitivity.

It will thus be seen that the objects of the present invention set forth above and made apparent from the preceding description are efficiently attained, and since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A rectifier circuit including means devoid of filter circuit means and adapted to maintain a substantially uniform voltage for D.-C. output under varying resistive and inductive loads and A.-C. supply potential conditions, comprising the combination with rectifier tube means having cathode means, anode means adapted for connection to one side of an A.-C. power supply means, and control grid means; of a pair of D.-C. output terminals with the negative terminal being adapted for connection to the other side of the power supply means, the positive output terminal being connected to the cathode means, and a sole source of the D.-C. potential type for the entire grid bias of the control grid means comprising reservoir condenser means and means to supply D.-C. control reference voltage connected directly between said negative output terminal and the control grid means; said D.-C. reference voltage supply means comprising voltage regulator tube means having anode means and cathode means, said regulator tube cathode means being connected to said negative output terminal, auxiliary rectifier means having its input side adapted for connection to the A.-C. power supply means and with its output side connected to said regulator tube anode means, and resistance means connected across the anode and cathode means of said regulator tube means with a tap thereon connected directly to said control grid means; said reservoir condenser means being connected across said pair of output terminals to integrate fluctuating load voltage, whereby the algebraic sum of the integrated load voltage and the D.-C. reference voltage constitutes the entire grid bias of the controlled rectifier tube means so that departure of the integrated load voltage from predetermined value will cause corresponding variations of that grid bias in a direction compensating for load voltage variation.

2. A rectifier circuit including means devoid of filter circuit means and adapted to maintain a substantially uniform voltage for D.-C. output under varying resistive and inductive loads and A.-C. supply potential conditions, comprising the combination with rectifier tube means having cathode means, anode means adapted for connection to one side of an A.-C. power supply means, and control grid means, of a pair of D.-C. output terminals with the negative terminal being adapted for connection to the other side of the power supply means, the positive output terminal being connected to the cathode means, control reference voltage means connected directly between said negative output terminal and the control grid means comprising voltage regulator tube means having anode means and cathode means, said regulator tube cathode means being connected to said negative output terminal, auxiliary rectifier tube means having anode means adapted for connection to the A.-C. power supply means and cathode means connected to said regulator tube anode means, and potentiometer means connected across anode and cathode means of said regulator tube means with a sliding tap thereon connected directly to said control grid means, and reservoir condenser means connected across said pair of output terminals to integrate fluctuating load voltage, whereby departure of integrated load voltage from predetermined value will cause variations of the grid bias of the controlled rectifier tube means in a direction compensating for load voltage variation.

3. A full wave rectifier circuit including means devoid of filter circuit means and adapted to maintain a substantially uniform voltage for D.-C. output under varying resistive and inductive loads and A.-C. supply potential conditions, comprising, in combination, a power supply mid-tapped transformer secondary, rectifier tube means having anode plates connected to turns intermediate the mid-tap and the ends of said secondary, a pair of D.-C. output terminals with the negative terminal being connected to the mid-tap of said secondary, said rectifier tube means having cathode means connected to the positive terminal of said pair of output terminals and also having control grids, control reference voltage means connected directly between said negative output terminal and said control grids comprising regulator voltage tube means having anode means and cathode means, said regulator tube cathode means being connected to said negative output terminal, auxiliary full wave rectifier tube means having anode plates connected to the ends of said secondary and a cathode circuit connected to said regulator tube anode means, and a potentiometer shunted around anode and cathode means of said regulator tube means with a sliding tap thereon connected directly to said control grids, and reservoir condenser means connected across said pair of output terminals to integrate fluctuating load voltage, whereby departure of integrated load voltage from predetermined value will cause variations of the grid bias of the controlled rectifier tube means in a direction compensating for each voltage variation.

LOUIS W. REINKEN.

REFERENCES CITED

The following references are of record in the file of this patent:

UNITED STATES PATENTS

| Number | Name | Date |
|---|---|---|
| 1,866,679 | Slepian | July 12, 1932 |
| 2,095,742 | Holler | Oct. 12, 1937 |
| 2,113,220 | Power | Apr. 5, 1938 |
| 2,271,738 | Leftwich | Feb. 3, 1942 |
| 2,315,445 | Milarta | Mar. 30, 1943 |